(12) United States Patent
Bernstein et al.

(10) Patent No.: US 7,020,871 B2
(45) Date of Patent: Mar. 28, 2006

(54) BREAKPOINT METHOD FOR PARALLEL HARDWARE THREADS IN MULTITHREADED PROCESSOR

(75) Inventors: Debra Bernstein, Sudbury, MA (US); Serge Kornfeld, Westborough, MA (US); Desmond R. Johnson, Rutland, MA (US); Donald F. Hooper, Shrewsbury, MA (US); James D. Guilford, Northborough, MA (US); Richard D. Muratori, Stow, MA (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 09/747,019

(22) Filed: Dec. 21, 2000

(65) Prior Publication Data

US 2004/0205747 A1  Oct. 14, 2004

(51) Int. Cl.
*G06F 9/44* (2006.01)

(52) U.S. Cl. ........................ 717/129; 717/130

(58) Field of Classification Search ............... 717/129, 717/124, 127, 174, 128, 130; 703/27, 87; 712/32, 40, 245; 708/231; 700/1, 26
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,913,074 A | 10/1975 | Homberg et al. | |
| 3,940,745 A | 2/1976 | Sajeva | |
| 4,023,023 A | 5/1977 | Bourrez et al. | |
| 4,130,890 A | 12/1978 | Adam | |
| 4,392,758 A | 7/1983 | Bowles et al. | |
| 4,400,770 A | 8/1983 | Chan et al. | |
| 4,514,807 A | 4/1985 | Nogi | |
| 4,523,272 A | 6/1985 | Fukunaga et al. | |
| 4,724,521 A | 2/1988 | Carron et al. | |
| 4,745,544 A | 5/1988 | Renner et al. | |
| 4,777,587 A | 10/1988 | Case et al. | |
| 4,866,664 A | 9/1989 | Burkhardt, Jr. et al. | |
| 5,073,864 A | 12/1991 | Methvin et al. | |

(Continued)

FOREIGN PATENT DOCUMENTS

EP  0 379 709  8/1990

(Continued)

OTHER PUBLICATIONS

Gernot Koch, Udo Kebschull, Wolfgang Rosenstiel, Breakpoints and Breakpoint Detection in Source Level Emulation, IEEE, 1996, p.: 26-31.*

(Continued)

*Primary Examiner*—Wei Y. Zhen
*Assistant Examiner*—Mary J. Steelman
(74) *Attorney, Agent, or Firm*—Fish & Richardson P.C.

(57) ABSTRACT

A method of debugging code that executes in a multithreaded processor having a microengines includes receiving a program instruction and an identification representing a selected one of the microengines from a remote user interface connected to the processor pausing program execution in the threads executing in the selected microengine, inserting a breakpoint after a program instruction in the selected microengine that matches the program instruction received from the remote user interface, resuming program execution in the selected microengine, executing a breakpoint routine if program execution in the selected microengine encounters the breakpoint and resuming program execution in the microengine.

12 Claims, 4 Drawing Sheets

| 31 | | 9 | 7 6 | 0 |
|---|---|---|---|---|
| | | | BREAK POINT | THREAD VECTOR |

U.S. PATENT DOCUMENTS

| | | |
|---|---|---|
| 5,113,516 A | 5/1992 | Johnson |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | 7/1995 | Fujiwara |
| 5,442,756 A | 8/1995 | Grochowski et al. |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,606,676 A | 2/1997 | Grochowski et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,644,623 A | 7/1997 | Gulledge |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,717,760 A | 2/1998 | Satterfield |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,839 A | 9/1998 | Hoyt et al. |
| 5,812,868 A | 9/1998 | Moyer et al. |
| 5,815,714 A * | 9/1998 | Shridhar et al. ............. 717/129 |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,838,975 A * | 11/1998 | Abramson et al. .......... 717/129 |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,956,514 A * | 9/1999 | Wen et al. .................. 717/127 |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,983,274 A | 11/1999 | Hyder et al. |
| 5,996,068 A | 11/1999 | Dwyer, III et al. |
| 6,002,881 A | 12/1999 | York et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,228 A | 2/2000 | Cai et al. |
| 6,058,168 A | 5/2000 | Braband |
| 6,058,465 A | 5/2000 | Nguyen |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,076,158 A | 6/2000 | Sites et al. |
| 6,079,008 A | 6/2000 | Clery, III |
| 6,079,014 A | 6/2000 | Papworth et al. |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,092,175 A | 7/2000 | Levy et al. |
| 6,112,016 A | 8/2000 | MacWilliams et al. |
| 6,115,811 A | 9/2000 | Steele, Jr. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,145,123 A * | 11/2000 | Torrey et al. ............... 717/128 |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |

| | | | |
|---|---|---|---|
| 6,223,207 B1 | 4/2001 | Lucovsky et al. | |
| 6,223,238 B1 | 4/2001 | Meyer et al. | |
| 6,223,279 B1 | 4/2001 | Nishimura et al. | |
| 6,230,119 B1 * | 5/2001 | Mitchell | 703/27 |
| 6,247,025 B1 | 6/2001 | Bacon | |
| 6,256,713 B1 | 7/2001 | Audityan et al. | |
| 6,272,616 B1 | 8/2001 | Fernando et al. | |
| 6,275,505 B1 | 8/2001 | O'Loughlin et al. | |
| 6,279,113 B1 | 8/2001 | Vaidya | |
| 6,289,011 B1 | 9/2001 | Seo et al. | |
| 6,298,370 B1 | 10/2001 | Tang et al. | |
| 6,307,789 B1 | 10/2001 | Wolrich et al. | |
| 6,324,624 B1 | 11/2001 | Wolrich et al. | |
| 6,345,334 B1 | 2/2002 | Nakagawa et al. | |
| 6,347,344 B1 | 2/2002 | Baker et al. | |
| 6,351,808 B1 | 2/2002 | Joy et al. | |
| 6,356,962 B1 | 3/2002 | Kasper et al. | |
| 6,360,262 B1 | 3/2002 | Guenthner et al. | |
| 6,373,848 B1 | 4/2002 | Allison et al. | |
| 6,378,124 B1 * | 4/2002 | Bates et al. | 717/129 |
| 6,378,125 B1 * | 4/2002 | Bates et al. | 717/129 |
| 6,389,449 B1 | 5/2002 | Nemirovsky et al. | |
| 6,393,483 B1 | 5/2002 | Latif et al. | |
| 6,415,338 B1 | 7/2002 | Habot | |
| 6,426,940 B1 | 7/2002 | Seo et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,463,072 B1 | 10/2002 | Wolrich et al. | |
| 6,532,509 B1 | 3/2003 | Wolrich et al. | |
| 6,543,049 B1 * | 4/2003 | Bates et al. | 717/129 |
| 6,552,826 B1 | 4/2003 | Adler et al. | |
| 6,560,667 B1 | 5/2003 | Wolrich et al. | |
| 6,577,542 B1 | 6/2003 | Wolrich et al. | |
| 6,584,522 B1 | 6/2003 | Wolrich et al. | |
| 6,587,906 B1 | 7/2003 | Wolrich et al. | |
| 6,606,704 B1 | 8/2003 | Adiletta et al. | |
| 6,625,654 B1 | 9/2003 | Wolrich et al. | |
| 6,629,237 B1 | 9/2003 | Wolrich et al. | |
| 6,631,430 B1 | 10/2003 | Wolrich et al. | |
| 6,631,462 B1 | 10/2003 | Wolrich et al. | |
| 6,661,794 B1 | 12/2003 | Wolrich et al. | |
| 6,667,920 B1 | 12/2003 | Wolrich et al. | |
| 6,668,317 B1 | 12/2003 | Bernstein et al. | |
| 6,681,300 B1 | 1/2004 | Wolrich et al. | |
| 6,694,380 B1 | 2/2004 | Wolrich et al. | |
| 2002/0053017 A1 | 5/2002 | Adiletta et al. | |
| 2002/0056037 A1 | 5/2002 | Wolrich et al. | |
| 2003/0041228 A1 | 2/2003 | Rosenbluth et al. | |
| 2003/0145159 A1 | 7/2003 | Adiletta et al. | |
| 2003/0191866 A1 | 10/2003 | Wolrich et al. | |
| 2004/0039895 A1 | 2/2004 | Wolrich et al. | |
| 2004/0054880 A1 | 3/2004 | Bernstein et al. | |
| 2004/0071152 A1 | 4/2004 | Wolrich et al. | |
| 2004/0073728 A1 | 4/2004 | Wolrich et al. | |
| 2004/0073778 A1 | 4/2004 | Adiletta et al. | |
| 2004/0098496 A1 | 5/2004 | Wolrich et al. | |
| 2004/0109369 A1 | 6/2004 | Wolrich et al. | |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| JP | 59111533 | 6/1984 |
| WO | WO 94/15287 | 7/1994 |
| WO | WO 97/38372 | 10/1997 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

Norman Ramsey, Correctness of trap-based breakpoint implementations, 1994, ACM Press, pp.: 15-24.*

Agarwal et al., "April: A Processor Architecutre for Multiprocessing," Proceedings of the 17th Annual International Symposium on Computer Architecutre, IEEE, pp. 104-114.

Byrd et al., "Multithread Processor Architectures," *IEEE Spectrum*, vol. 32, No. 8, New York, Aug. 1, 1995, pp. 38-46.

Chang et al., "A New Mechanism For Improving Branch Predictor Performance," IEEE, pp. 22-31 (1994).

Doyle et al., *Microsoft Press Computer Dictionary*, 2nd ed., Microsoft Press, Redmond, Washington, USA, 1994, p. 326.

Farkas et al., "The multicluster architecture: reducing cycle time through partitioning," IEEE, vol. 30, Dec. 1997, pp. 149-159.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hennessy et al., "Computer Organization and Design: The Hardware/Software Interface," Morgan Kaufman Publishers, 1998, pp. 476-482.

Hyde, R., "Overview of Memory Management," *Byte* vol. 13, No. 4, 1998, pp. 219-225.

Intel, "IA-64 Application Developer's Architcture Guide," Rev.1.0, May 1999, pp. 2-2, 4-29 to 4-31, 7-116 to 7-118 and c-21.

Keckler et al., "Exploiting fine grain thread level parallelism on the MIT multi-ALU processor," IEEE, Jun. 1998.

Litch et al., "StrongARMing Portable Communications," IEEE Micro, 1998, pp. 48-55.

Mendelson et al., "Design Alternatives of Multithreaded Architecture," *International Journal of Parallel Programming*, vol. 27, No. 3,Plenum Press, New York, USA, Jun. 1999, pp. 161-193.

Paver et al., "Register Locking in Asynchronous Processor Computer Design: VLSI Processors," ICCD '92 Proceedings, IEEE 1992 International Conference, 1992, pp. 385-398.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wadler, "The Concatenate Vanishes," University of Glasgow, Dec. 1987 (revised Nov. 1989), pp. 1-7.

Waldspurger et al., "Register Relocation: Flexible Contents for Multithreading," Proceedings of the 20the Annual International Symposium on Computer Architecture, 1993, pp. 120-130.

Wazlowski et al., "PRSIM-II computer and architecture," IEEE Proceedings, Workshop on FPGAs for Custom Computing Machines, 1993.

U.S. Appl. No. 09/473,571, filed Dec. 28, 1999, Wolrich et al.

U.S. Appl. NO. 09/475,614, Dec. 30, 1999, Wolrich et al.

\* cited by examiner

BREAKPOINT METHOD FOR PARALLEL HARDWARE THREADS IN MULTITHREADED PROCESSOR

TECHNICAL FIELD

This invention relates to breakpoint method for parallel hardware threads in a multiprocessor.

BACKGROUND

Parallel processing is an efficient form of information processing of concurrent events in a computing process. Parallel processing demands concurrent execution of many programs in a computer, in contrast to sequential processing. That is, in general all or a plurality of the stations work simultaneously and independently on the same or common elements of a problem.

Parallel processing involves multiple processors. The execution path of a microprocessor within a parallel system is highly pipelined.

In a parallel processor where many threads of execution can run simultaneously, there is a need for debugging software running on selected threads. Debugging may be used to determine a cause (or causes) of errors in the processing threads, and to correct the errors.

Debug methods implement breakpoints in software by a combination of inserting traps and single stepping. When the target program contains multiple threads of execution, a debug method that is not carefully implemented may miss breakpoints and be less than helpful to the developer.

DETAILED DESCRIPTION

Figure 1:
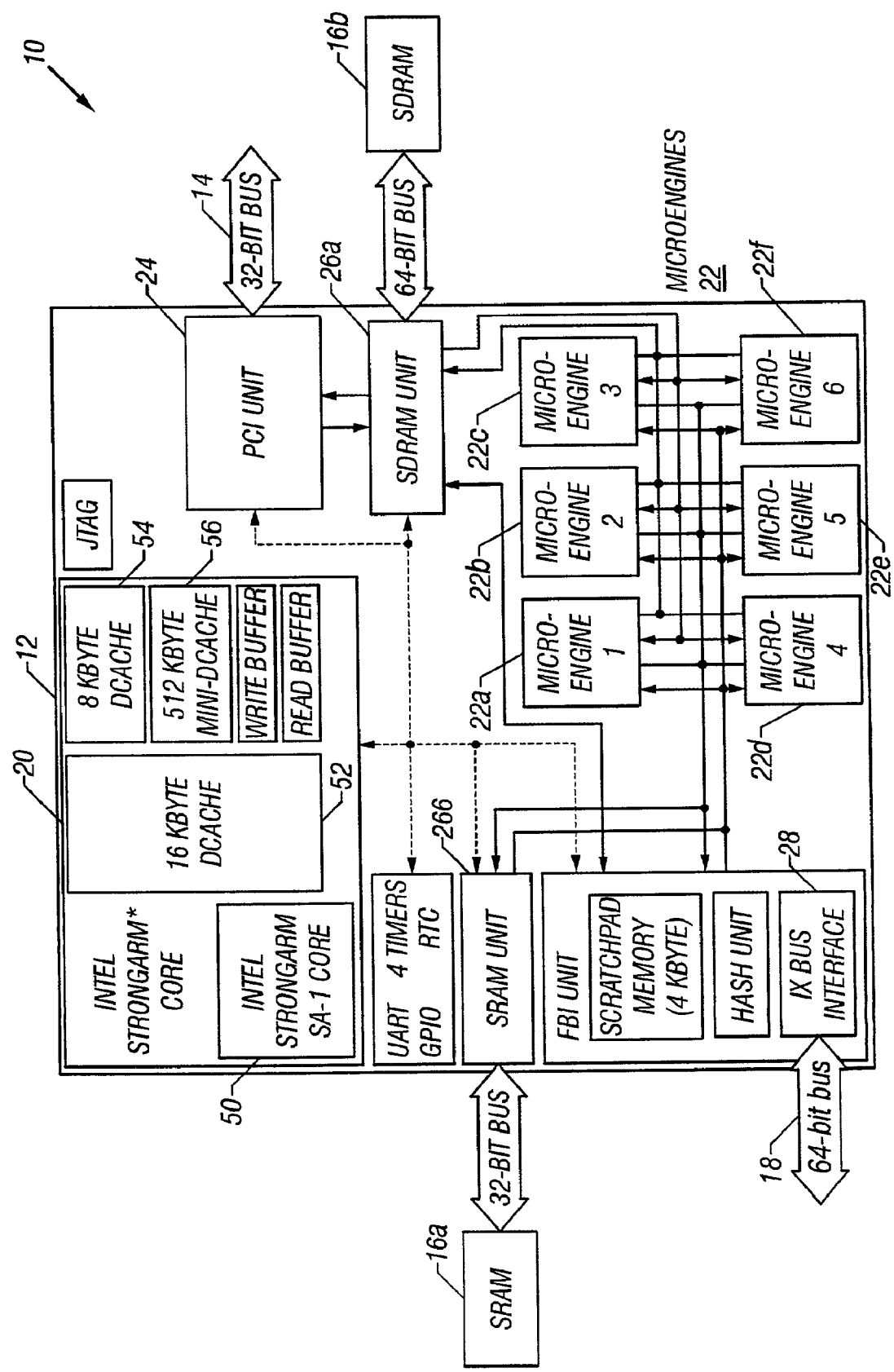
FIG. 1 is a block diagram of a communication system employing a hardware based multithreaded processor.

Referring to FIG. 1, a communication system 10 includes a parallel, hardware based multithreaded processor 12. The hardware-based multithreaded processor 12 is coupled to a bus 12, such as a PCI bus, a memory system 16 and a second bus 18. The system 10 is especially useful for tasks that can be broken into parallel subtasks or functions. Specifically, hardware-based multithreaded processor is useful for tasks that are bandwidth oriented rather than latency oriented. The hardware-based multithreaded processor 12 has multiple microengines 22, each with multiple hardware controlled threads (also referred to as contexts) that can be simultaneously active and independently work on a task.

The hardware-based multithreaded processor 12 also includes a central processor 20 that assists in loading microcode control for other resources of the hardware-based multithreaded processor 12 and performs other general purpose computer type functions, such as handling protocols, exceptions, extra support for packet processing where the microengines pass the packets off for more detailed processing, such as in boundary conditions. In an embodiment, the processor 20 is a Strong ARM® (ARM is a trademark of ARM Limited, United Kingdom) based architecture. The processor 20 has an operating system. Through the operating system, the processor 20 can call functions to operate on microengines 22. The processor 20 can use any supported operating system, preferably a real-time operating system. For a processor 20 implemented as a Strong ARM® architecture, operating systems such as Microsoft NT Real-Time, VXWorks and µCUS, a freeware operating system available over the Internet, can be used.

As mentioned above, the hardware-based multithreaded processor 12 includes a plurality of functional microengines 22a–f. Functional microengines (microengines) 22a–f each maintain a number of program counters in hardware and states associated with the program counters. Effectively, a corresponding plurality of sets of threads can be simultaneously active on each of the microengines 22a–f while only one is actually operating at any one time.

In an embodiment, there are six microengines 22a–f, as shown. Each of the microengines 22a–f has capabilities for processing four hardware threads. The six microengines 22a–f operate with shared resources, including memory system 16 and bus interfaces 24 and 28. The memory system 16 includes a synchronous dynamic random access memory (SDRAM) controller 26a and a static random access memory (SRAM) controller 26b. SRAM memory 16a and SRAM controller 26a are typically used for processing large volumes of data, e.g., processing of network payloads from network packets. The SDRAM controller 26b and SDRAM memory 16b are used in a networking implementation for low latency fast access tasks, e.g., accessing lookup tables, memory from the core processor, and so forth.

The six microengines 22a–f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16b. The microengines 22a–f can execute memory reference instructions to either the SDRAM controller 26a or SRAM controller 26b.

Advantages of hardware multithreading can be explained by SRAM or SDRAM memory accesses. As an example, an SRAM access requested by a thread_0, from a microengine will cause the SRAM controller 26b to initiate an access to the SRAM memory 16a. The SRAM controller 26b controls arbitration for the SRAM bus, accesses the SRAM 16a, fetches the data from the SRAM 16a, and returns data to a requesting microengine 22a–f. During an SRAM 26b access, if the microengine, e.g. microengine 22a, had only a single thread that could operate, that microengine would be dormant until data was returned from the SRAM 26b. By employing hardware context swapping within each of the microengines 22a–f, the hardware context swapping enables only contexts with unique program counters to execute in that same microengine. Thus, another thread, e.g., thread_1 can function while the first thread, e.g., thread_0, is awaiting the read data to return. During execution, thread_1 may access the SDRAM memory 26a. While thread_1 operates on the SDRAM unit, and thread_0 is operating on the SRAM unit, a new thread, e.g., thread_2 can now operate in the microengine 22a. Thread_2 can operate for a certain amount of time, until it needs to access memory or perform some other long latency operation, such as making an access to a bus interface. Therefore, simultaneously, the processor can have a bus operation, an SRAM operation and SDRAM operation all being completed or operated upon by one microengine 22a and have one or more threads available to process more work in the data path.

Each of the microengines 22a–f includes an arbiter that examines flags to determine the available threads to be operated upon. Any thread from any of the microengines 22a–f can access the SDRAM controller 26a, SRAM controller 26b or bus interface. The memory controllers 26a and 26b each include a number of queues to store outstanding memory reference requests. The queues either maintain order of memory references or arrange memory references to optimize memory bandwidth. For example, if a thread_0 has no dependencies or relationship to a thread_1, there is no reason that thread_1 and thread_0 cannot complete their memory references to the SRAM unit 26b out of order. The microengines 22a–f issue memory reference requests to the memory controllers 26a and 26b. The microengines 22a–f flood the memory subsystems 26a and 26b with enough memory reference operations such that the memory subsystems 26a and 26b become the bottleneck for processor 12 operation. Microengines 22a–f can also use a register set to exchange data.

The processor 20 includes a RISC core 50, implemented in a five-stage pipeline performing a single cycle shift of one operant or two operants in a single cycle, provides multiplication support and 32-bit barrel shift support. This risc core 50 is a standard Strong Arm® architecture, but is implemented with a five-stage pipeline for performance reasons. The processor 20 also includes a 16-kilobyte instruction cache 52, an 8-kilobyte data cache 54 and a prefetch stream buffer 56. The core processor performs arithmetic operations in parallel with memory writes and instruction fetches. The processor 20 interfaces with other functional units via the ARM defined ASB bus. The ASB bus is a 32-bit bi-directional bus.

Figure 2:
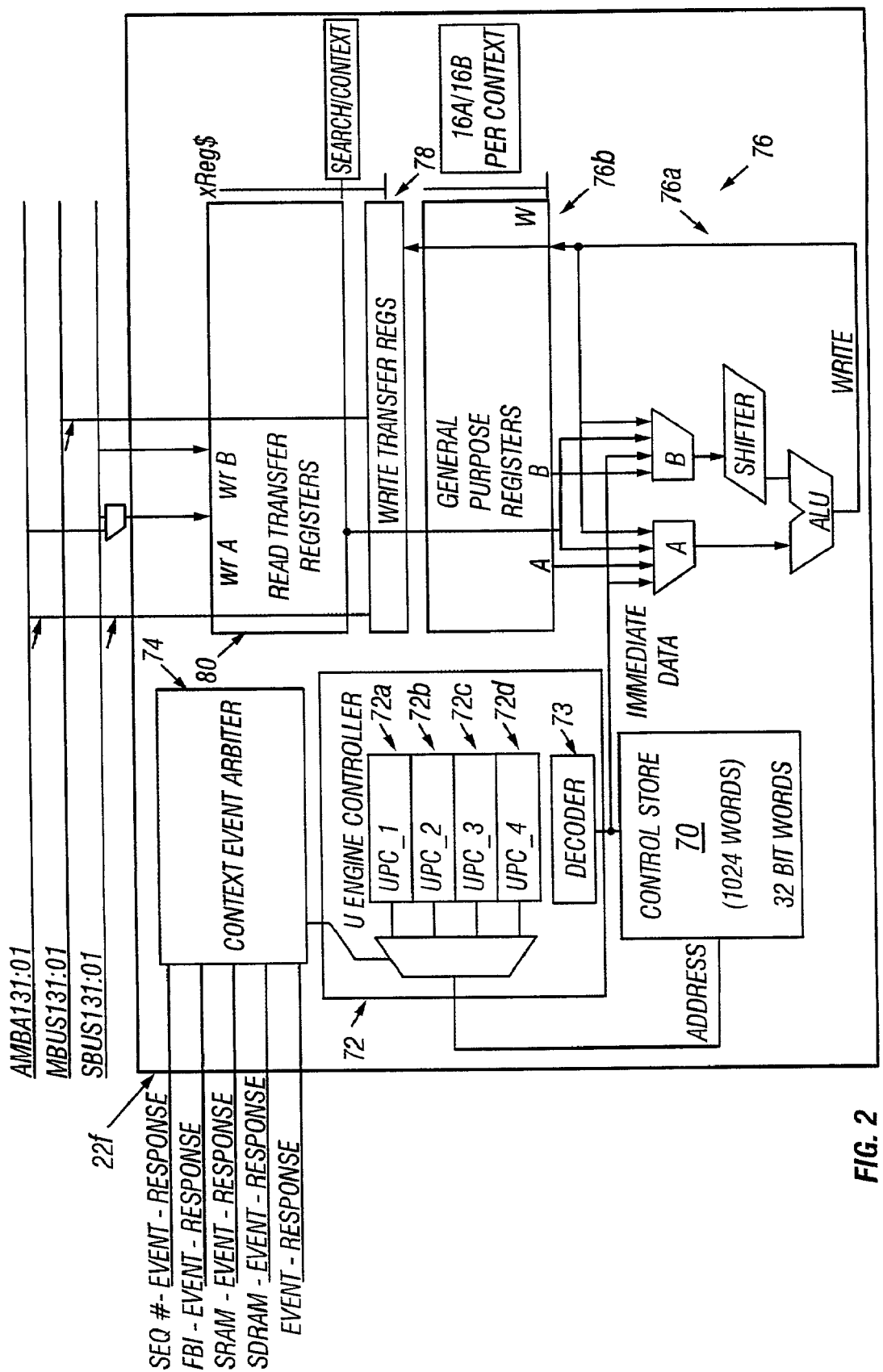
FIG. 2 is a block diagram of a microengine functional unit employed in the hardware based multithreaded processor of FIGS. 1 and 2.

Referring to FIG. 2, an exemplary one of the microengines, microengine 22f, is shown. The microengine 22f includes a control store 70, which, in an implementation includes a RAM of here 1,024 words of 32-bits each. The RAM stores eight microprogram. The microprogram is loadable by the processor 20. The microengine 22f also includes controller logic 72. The controller logic 72 includes in instruction decoder 73 and program counter units 72a–d. The four program counters 72a–d are maintained in hardware. The microengine 22f also includes context event switching logic 74. Context event switching logic 74 receives messages from each of the shared resources, e.g., SRAM 16a, SDRAM 16b, or processor 20, control and status registers, and so forth. These messages provide information on whether a requested function has completed. Based on whether or not a function requested by a thread (or context) has completed a signaled completion, the thread needs to wait for that completion signal, and if the thread is enabled to operate, then the thread is placed on an available thread list (not shown). The microengine 22f can have a maximum four threads available in the example of FIG. 2.

In addition to event signals that are local to an executing thread, the microengines 22 employ signaling states that are global. With signaling states, an executing thread can broadcast a signal state to all microengines 22. Receive request available signal, any and all threads in the microengines can branch on these signaling states. These signaling states can be used to determine the availability of a resource or whether a resource is due for servicing.

The context event logic 74 has arbitration for the four threads in the example. In an embodiment, the arbitration is a round robin mechanism. Other techniques could be used, including priority queuing or weighted fair queuing. The microengine 22f also includes an execution box (EBOX) datapath 76 that includes an arithmetic logic unit 76a and general purpose register set 76b. The arithmetic logic unit 76a performs arithmetic and logical functions as well as shift functions. The register set 76b has a relatively large number of general purpose registers. General purpose registers are windowed so that they are relatively and absolutely addressable.

The microengine 22f also includes a write transfer register stack 78 and a read transfer stack 80. These registers 78 and 80 are also windowed so they are relatively and absolutely addressable. The write transfer register stack 78 is where write data to a resource is located. Similarly, the read register stack 80 is for returned data from a shared resource. Subsequent to, or concurrent with data arrival, an event signal from the respective shared resource, e.g., the SRAM controller 26b, the SDRAM controller 26a, or processor 20 will be provided to context event arbiter 74 which will then alert the thread is available or has been sent. Both transfer register banks 78 and 80 are connected to the execution box 76 through a datapath. In an implementation, the read transfer register 80 has sixty-four registers and the write transfer register 78 has sixty-four registers.

Each microengine 22a–f supports multi-threaded execution of four contexts. One reason for this is to allow one thread to start executing just after another thread issues a memory reference and must wait until that reference completes before doing more work. This behavior is critical to maintaining efficient hardware execution of the microengines, because memory latency is significant. Stated differently, if only a single thread execution was supported, the microengines would sit idle for a significant number of cycles waiting for references to return and thus reduce overall computational throughput. Multithreaded execution involves all microengines to hide memory latency by performing useful, independent work across several threads.

When errors occur in software running in one or more of the threads of execution, there is a need for debugging the software running on selected threads to determine a cause (or causes) of the errors and to aid a software developer to correct the errors.

Figure 3:
FIG. 3 is a block diagram of an interrupt register.

Referring to FIG. 3, as described above, a multiprocessor 500 has many threads of execution, threads 502a–d for example, that are supported by the hardware. The core processor 504 runs the ARM instruction set, and executes one software thread at a time, in accordance with its corresponding program counter. In an embodiment, there are twenty-four hardware-supported threads. Any of these threads can interrupt the core processor 504 by issuing a write operation to a specified control and status register (CSR) referred to as an interrupt register 506.

In a normal interrupt, a hardware-supported thread, thread 502a for example, executes a write to the interrupt register 506 that carries ten bits of immediate data. A "1" in bits 6:0 is shifted left by the value of the hardware thread identification and inserted into the interrupt register.

Figure 4:
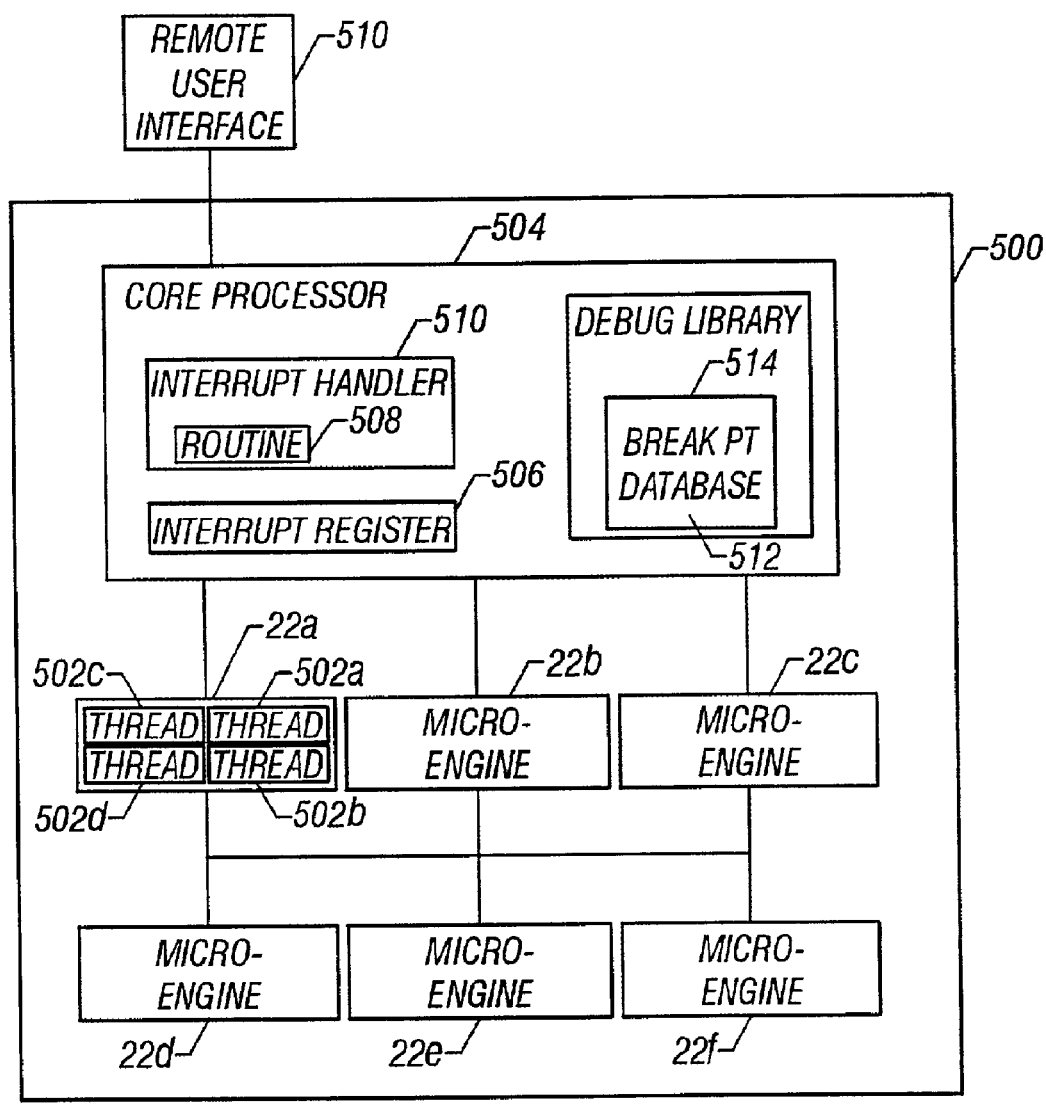
FIG. 4 is a block diagram of a hardware based multi-threaded processor adapted to enable a breakpoint method.

Referring to FIG. 4, the interrupt register 506 is a 32-bit register contained within the controlling processor 504. Bits 9:7 are designated breakpoint bits 600 and bits 6:0 are designated as a thread vectors 602. A non-zero value of the breakpoint bits 600 indicates the interrupt is a breakpoint interrupt. When a breakpoint occurs, a value of bits 9:7 of intermediate data is inserted into the breakpoint bits 600. A "1" in bits 6:0 of the intermediate data is shifted left by the value of the hardware thread identification to generate a thread vector; the thread vector is inserted into the thread vector bits 602 of the interrupt register 506.

At any time, more than one thread can issue a normal interrupt or an interrupt indicating a breakpoint. If the interrupt indicates a breakpoint, the core processor 504 traps to an interrupt handling routine 508 in an interrupt handler 510, where the interrupt register 506 is read. If the breakpoint field is non-zero, it can be used to narrow the source of the breakpoints to three groups of threads. Bits 23:0 are used to identify which threads have raised an interrupt.

The core processor 504 is linked to a remote user interface 511. A user (not shown) inputs a source code line to be breakpointed in one of the microengines using the remote user interface 511. The source code line is sent to the central processor 504. The central processor 504 searches a breakpoint database 512 in a debug library 514 to determine whether the instruction corresponding to the source code line can be breakpointed. Since there are certain cases where breakpointing is not allowed, i.e., a trap in the code cannot be inserted at this position in the code to signal a breakpoint. For example, if two instructions must be executed in succession, i.e., a register of one is used in the very next cycle in the next, the first instruction cannot be breakpointed. This is because the software breakpoint inserts a branch to displace the breakpointed instruction, thus separating the two instructions.

After searching its breakpoint database 512 and determining that an instruction may be breakpointed, the core processor 504 invokes a remote procedure call (RPC) referred to as SetBreakpoint to the debug library 514. The SetBreakpoint RPC identifies which microengine (which instruction code) to insert the breakpoint into, which program counter (PC) to breakpoint at, which microengine threads (also referred to as contexts) to enable breakpoint for, and which microengines to stop if the breakpoint occurs.

The function definition for the set breakpoint RPC to the debug library is as follows:

```
typedef struct      uDbg_Bkpt {
    void (*callback) (unsigned short bkptId,
unsigned char ueng, unsigned char ctx, void *userdata);
        short id; //out:the assigned ID of the breakpoint
        unsigned short ctx; //out: context at breakpoint
        unsigned shortμAddv; //in:micro-store address
        unsigned char μEng; //in:microengine at breakpoint
        void *usrData; //in:pointer to user data
        uDbg_CTX_T breakIfCtx; //in:break if equal to ctx
        unsigned int stpOnBrkUengMask; //in:microengines to
stop on break
} uBbg_Bkpt_T;
```

The debug library 514 generates a breakpoint routine by modifying a template of several instructions, inserts the breakpointing instruction and inserts a branch to the location of the instruction after the breakpoint instruction. The breakpoint instruction is essentially a branch instruction to the breakpoint routine.

An example breakpoint template follows:
unsigned int breakInst[NUM_BKPT_INST]={
NOP, // may be replaced by: BR!=CTX, or BR=CTX
NOP, // may be replaced by: BR!=CTX, or BR=CTX
DISABLE_CTX, // disable context
NOP, // nop:
NOP,
NOP,
FAST_WR, // fast_wr[0x80, ireg]=breakpoint interrupt
CTX_ARB, // ctx_arb[voluntary]
0x9A0007B0, // statement at breakpoint placeholder—to be altered
BR}; //br[pr]—to be altered to breakpoint +1

After the breakpoint instruction is inserted into the selected microengine, the microengine with this breakpoint code is resumed or restarted. If program execution within the microengine gets to the breakpoint program counter, program execution branches to the breakpoint routine and interrupts the core processor 504 with a breakpoint interrupt. If a breakpoint is set, the interrupt handler 510 calls the debug library 514. The interrupt handler 514 can quickly handle breakpoints by reading the program counters of the interrupting threads. The debug library 514 stops the selected threads (and bus ports) for the breakpoint. The debug library 514 determines which thread(s) sent the breakpoint interrupt. The debug library 514 replies to the user on the remote user interface 511, allowing the user to examine the state of the saved threads (and ports). The user selects a resume command that initiates resume remote procedure call to the debug library 514. The resume identifies which microengines (and ports) to resume. Upon receiving this resume RPC, the debug library 514 insures the thread that the sent the breakpoint interrupt will be next to start by setting a control and status register with context enable. The debug library 514 restarts the microengines (and bus ports) indicated by the resume command.

Figure 5:
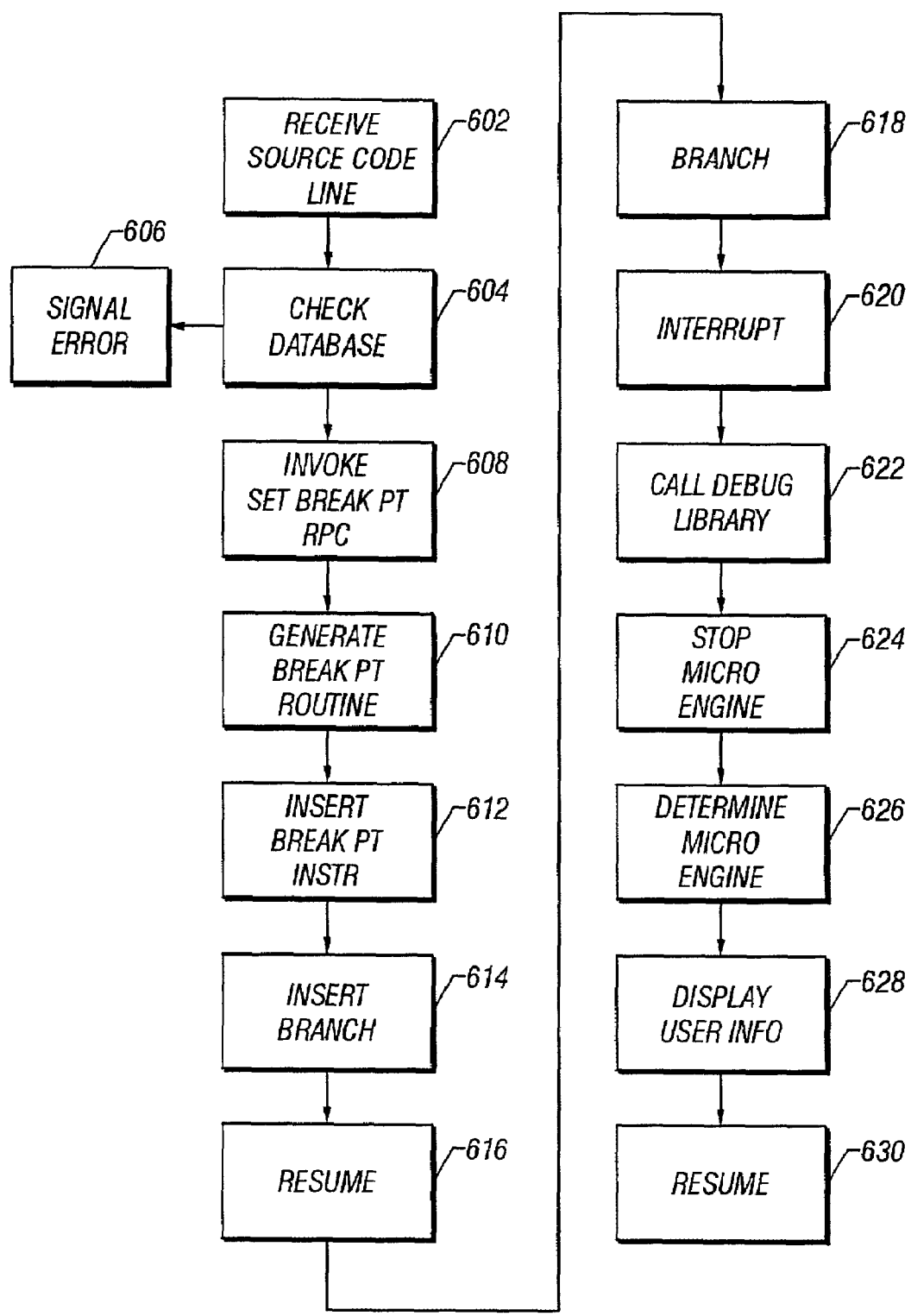
FIG. 5 is a flow chart of a breakpoint method for selectively stopping parallel hardware threads from a debug console.

Referring to FIG. 5, a breakpoint process 600 for selectively stopping parallel hardware threads from a remote user interface includes receiving 602 source code line to be breakpointed in a microengine. The process 600 fetches data 604 within its database to determine whether the source code line in the microengine may be breakpointed. If not, the process 600 signals 606 an error to the user. If the source code line can be breakpointed, the process 600 invokes 608 a setbreakpoint RPG to the debug library. The setbreakpoint RPC identifies which microengine (or bus port) to insert the breakpoint into, which program counter to breakpoint at, which microengine threads to enable breakpoints for, and which microengines (or bus ports) to stop if a breakpoint occurs.

The process 600 causes the debug library to generate 610 a breakpoint routine by modifying a template of several instructions, to insert 612 the breakpoint instruction and to insert 614 a branch to the location after the breakpoint instruction.

After the breakpoint routine is inserted 612, the process 600 causes the microengine with the inserted breakpoint routine to resume 616. If program execution in the microengine gets to the breakpoint PC, program execution branches 618 to the breakpoint routine and interrupts 620 the core processor with the breakpoint interrupt.

The process 600 causes the interrupt handler to call 622 the debug library. The debug library stops 624 the selected threads (and bus ports) for the breakpoint and determines 626 which microengine sent the interrupt. The process 600 causes the debug library to display 626 information to the user.

The process 600 receives 630 a resume command from the user and in response sets the context enable bit for the selected microengine. Setting of the context enable bit starts the microengine back into normal program execution outside of the breakpoint routine.

An embodiment of the invention has been described. Nevertheless, it will be understood that various modifications may be made without departing from the spirit and scope of the invention. For example, reset, start, pause and resume remote procedure calls can be used with the controlled stop/start of selected microengines (and bus ports). The RPC "Reset" stops the selected microengines (and bus ports) immediately, whereas the RPC "Start" starts the microengines at program counter 0 (and starts the bus ports). The RPC "Pause" stops selected microengines (and bus ports) at a safe, i.e., non-destructive stopping point. The RPC "Resume" starts the microengines at their current program counters (and starts the bus ports). Accordingly, other embodiments are within the scope of the following claims.

What is claimed is:

1. A computer-implemented method comprising:
   in parallel hardware threads executing in a processor comprising a plurality of microengines, receiving a source code line to be break pointed in a selected microengine;
   determining whether the source code line can be break pointed;
   if the source code line can be break pointed, identifying the selected microengine to insert a break point into, which microengine threads to enable breakpoints for, and which microengines to stop if a break point occurs; and
   if the source code line cannot be break pointed, signaling an error.

2. The computer-implemented method of claim 1 wherein identifying further comprises generating a break point routine by modifying a template of instructions stored in a debug library.

3. The computer-implemented method of claim 2 wherein identifying further comprises inserting a break point at the source code line and a branch to the source code line.

4. The computer-implemented method of claim 3 further comprising:
   executing the parallel hardware threads until the break point is encountered; and
   executing the break point routine, the break point routine stopping selected threads and determining which microengine sent an interrupt.

5. The computer-implemented method of claim 4 further comprising displaying program information to a user.

6. The computer-implemented method of claim 5 further comprising resuming execution of the parallel threads in response to a user input.

7. A processor that can execute multiple parallel threads in multiple microengines and that comprises:
   a register stack;
   a program counter for each executing context;
   an arithmetic logic unit coupled to the register stack and a program control store that stores a breakpoint routine that causes the processor to:
   receive a source code line to be break pointed in a selected microengine;
   determine whether the source code line can be break pointed;
   if the source code line can be break pointed, identify the selected microengine to insert a break point into, which microengine threads to enable breakpoints for, and which microengines to stop if a break point occurs; and
   if the source code line cannot be break pointed, signal an error.

8. The processor of claim 7 wherein identifying further comprises generating a break point routine by modifying a template of instructions stored in a debug library.

9. The processor of claim 8 wherein identifying further comprises inserting a break point at the source code line and a branch to the source code line.

10. The processor of claim 9 wherein the breakpoint routine further causes the processor to:
    execute the parallel threads until the break point is encountered; and
    stop selected threads and determine which microengine sent an interrupt.

11. The processor of claim 10 wherein the breakpoint routine further causes the processor to display program information to a user.

12. The processor of claim 11 the breakpoint routine that causes the processor to resume execution of the parallel threads in response to a user input.

* * * * *